AIRCRAFT MAGNETIC RECORDING SYSTEM HAVING A RECORDER FOR CRASH DATA AND A RECORDER FOR BOTH CRASH DATA AND FLIGHT CONDITIONS

Filed July 26, 1966

2 Sheets-Sheet 1

United States Patent Office 3,461,429
Patented Aug. 12, 1969

3,461,429

AIRCRAFT MAGNETIC RECORDING SYSTEM HAVING A RECORDER FOR CRASH DATA AND A RECORDER FOR BOTH CRASH DATA AND FLIGHT CONDITIONS

Michael Richard Gray, Feltham, England, assignor to Epsylon Research and Development Company Limited, Bedfont, Feltham, Middlesex, England, a British Company Filed July 26, 1966, Ser. No. 567,869
Claims priority, application Great Britain, July 28, 1965, 32,356/65
Int. Cl. G11b *13/00;* G01d *9/06;* H03k *13/02*
U.S. Cl. 340—172.5 3 Claims

ABSTRACT OF THE DISCLOSURE

A magnetic recording system for aircraft in which data of a kind usable for establishing flight conditions prior to a crash, and additional data representative of other conditions during a flight, are processed to produce data words each representing an instantaneous condition, the data words representing the crash data are recorded serially in a recorder having an endless metal recording element, and both the crash data and the additional data are recorded on a magnetic tape which is removable at the end of the flight to enable flight conditions and the correct functioning of the aircraft during the flight to be monitored.

This invention relates generally to magnetic recording systems for aircraft, and more especially to a system for recording certain data in a "crash recorder" and recording the same data, together with additional data, in a second recorder, the crash recorder being permanently installed and at least a part of the second recorder being readily removable so that the data recorded therein may be used subsequently to analyse and evaluate the flight, to obtain particulars of the conditions during the flight, and to check the operation of various units of the aircraft's equipment during the flight.

When a large modern aircraft crashes it may lead to the loss of a considerable number of lives and, in addition, to the loss of a very large capital sum. In order to reduce the risk of crashes, so-called "crash recorders" have been coming into use in recent years to record the positions of controls, the airspeed, height and attitude of the aircraft, and other vital flight information, continuously. The recording medium is usually in endless form and of such length as to store the required data for a predetermined period, for example half an hour, and the old data is automatically erased as new data is recorded. The crash recorder, or at least the recording medium thereof, is contained in a crash-proof capsule which is so constructed that it will withstand a heavy buffeting and shock and will also withstand fire temperatures for a reasonable period. It is mounted in a position from which it may easily be ejected if the aircraft crashes or be recovered from the wreckage if it remains in the aircraft. It may, for example, be installed in the tail of the aircraft. The capsule is also arranged so that if it falls into the sea it will float.

If the aircraft should crash, the capsule containing the recorder, or at least the recording medium, may be recovered and the record may be played back to provide information on the operating conditions of the aircraft, the positions of the controls and the state of operation of vital parts of the aircraft equipment right up to the time of the failure which caused the crash. From this information it may be possible to determine the exact cause of the crash and, as a corollary, to take steps to prevent crashes from similar causes in the future.

If the data recorded in the crash recorder is supplemented by additional data relating to the operation of various units of the aircraft, the whole of the data may be analyzed at the end of each normal flight to provide a great deal of useful information, for example, to establish the degree of efficiency with which the engines and other units were functioning, the height and speed at which the aircraft was flying, and so on. The principal object of the invention is to provide a recording system for aircraft in which vital data required for investigating a crash is recorded in a crash recorder which is permanently installed in the aircraft, and in which the same crash data, supplemented by additional data, is recorded in a second recorder which may be removed from the aircraft at the end of each flight and replaced by a similar recorder, the whole of the information recorded in the second recorder being available for later analysis and evaluation.

The invention consists of a magnetic recording system for aircraft comprising a first magnetic recorder for recording data usable for establishing conditions preceding a crash, a second magnetic recorder on which the same data and additional data may be recorded, at least the recording medium of the second recorder being readily removable, a normalizing unit to receive the outputs of a plurality of transducers and convert them all to equivalent analogue voltages, switching means to select each normalized output in turn, means to convert the analogue voltages to digital data, a serializer in which digital data words corresponding to successive items of data are received and temporarily stored, the bits making up each data word being transmitted directly to the first recorder for recording in serial form, the said bits being stored in the serializer and being recorded in parallel in the second recorder.

Preferably the first recorder in which the crash data is recorded serially is a magnetic wire recorder and the second recorder upon which the combined data is recorded is a multiple track magnetic tape recorder.

In a preferred embodiment items of crash data and additional data are supplied in alternating order so that only alternate items of data are recorded in the first recorder, the recorders work to a predetermined time cycle, and the alternating order is varied once in each time cycle, so that particular items, and the times, may be identified without recording special time or recognition signals. In one arrangement two items of crash data are supplied consecutively followed by two items of additional data, so that two series of digital impulses occur immediately following each other in the crash recorder, followed by a double interval, this break in the regular sequence being synchronized with the operation of a clock.

To promote a clear understanding of the invention, one embodiment thereof will be described by way of example with reference to the accompanying drawings, in which.

Figure 1:
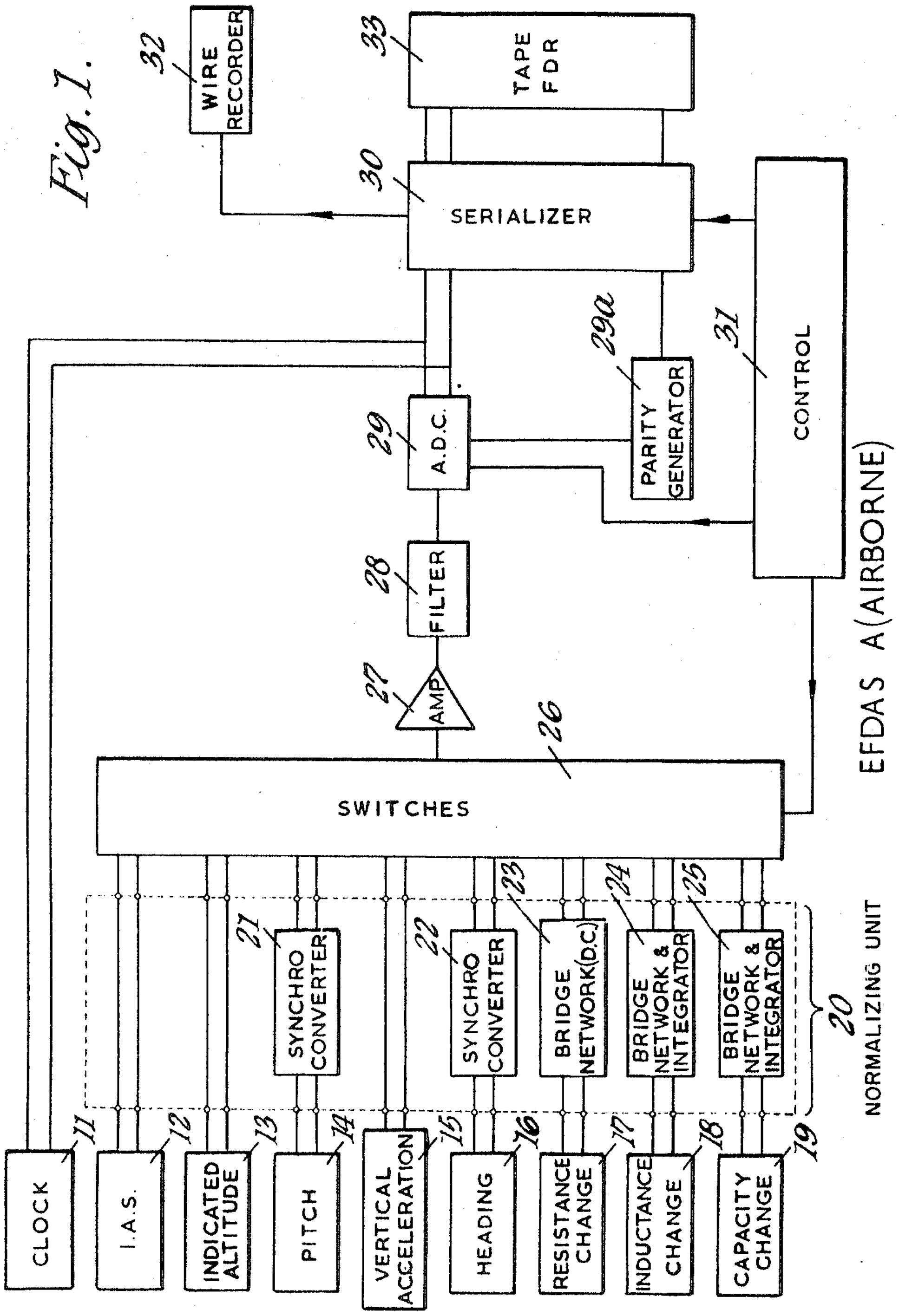
FIGURE 1 is a block schematic diagram of a system according to the invention.

Referring to FIGURE 1, the system includes a clock 11 which supplies timing pulses. A number of blocks are shown below the clock 11 and represent transducers which produce signals of various types corresponding to the operation of instruments with which they are associated. Thus the block 12 represents a transducer providing a signal corresponding to the indicated air speed, the block 13 represents a transducer to provide a signal corresponding to the indicated altitude, transducer 14 signals the aircraft pitch, transducer 15 signals vertical acceleration, transducer 16 signals the heading of the aircraft, block 17 represents cymbolically any transducer which operates by producing a resistance change in response to a change in the monitored parameter, block 18 represents symbolically any transducer which produces an inductance change in response to a change in the monitored parameter, and block 19 represents symbolically any transducer which produces a capacitance change in response to a change in the monitored parameter. All these signals are fed to a unit 20 which will be referred to as a normalizing unit.

The indicated air speed signal from block 12 is assumed to be in a form suitable for conversion to digital form after amplification and it is passed straight through the normalizing unit, as is the signal representing the indicated altitude. On the other hand, the signal from the transducer 14, representing pitch, is derived form a synchro element and this is passed through a synchro converter 21 contained in the normalizing unit which converts the signal into an analogue form suitable for conversion to digital form after amplification. The signal from the transducer 15 is also passed straight through the normalizing unit, whereas the signal from the transducer 16, representing heading, is also derived from a synchro element and is passed through a further synchro converter 22. The signal from the transducer 17, representing a resistance change, is normalized in a bridge network 23 in the normalizing unit 20, while the signal from the block 18, representing an inductance change, is passed through a normalizing circuit 24 comprising an A.C. bridge network and integrator. The signal from the block 19 representing a capacitance change is dealt with by a similar bridge network and integrator 25.

The various outputs from the normalizing unit are passed to a series of switches represented by a block 26, thence through an amplifier 27 and a filter 28, to an analogue-to-digital converter 29 and the output from the unit 29 is passed to a serializer 30. A parity generator **29*a*** checks the digits for odd parity, in a manner which is in itself known, to ensure that the information has been correctly supplied.

The clock 11 provides timing signals and these, through a control unit 31, control the operation of the switches contained in the block 26 so that an item of crash information to be recorded in a magnetic wire crash recorder 32 and in a magnetic tape flight data recorder 33 is followed by an item of additional information which is only to be recorded in the flight data recorder 33. Since the wire recorder is running at a uniform speed the items of data are uniformly spaced along the wire. This alternating sequence is continued throughout the time periods set by the clock 11 except for one instance. If, for example, the whole of the data is to be recorded once per second, then it is arranged that once in each second (preferably at the beginning of each one-second period) two items of crash data are supplied consecutively, followed by two items of additional data. The control 31 controls the serializer 30 to ensure that the data is recoreded in the appropriate recorders so that the wire recorder, at the beginning of the time period, receives two consecutive items of data and the bits representing the items are recorded in a series without a space between them, and this is followed by a space of double the normal length while the two items of additional data are being supplied to the tape recorder 33. In this way, it is possible to identify the beginning of each time period, and since the items of data are recorded in a predetermined order it is also possible to identify each item of data recorded in the wire recorder 32 by its position in relation to the double item without the necessity for recording special timing or identification signals. Consequently the wire recorder contains only the required data with no added identification or other signals.

Assuming that a complete series of recordings is made each second, it may be desired to record certain data twice per second. In such a case, the switches 26 are so arranged that the transducer in question is brought into circuit twice during each time period and the information will then occupy two of the recording positions in the recorders 32 and 33.

For the purpose of the present description, it is assumed that 25 separate items are to be recorded in the crash recorder 32 and these 25 items, together with a further 25 items of additional data, are to be recorded in the tape recorder 33. It will also be assumed that each item of data, that is to say, each data word, is made up of ten bits representing binary units and one parity bit, so that the 10 data bits permit 1,024 variations. That is to say, if a magnitude is being recorded then 1,024 increments of magnitude may be recognized. If this degree of fineness is insufficient then it is possible to use two of the recording positions to record the item of data more precisely, the first being a "coarse" data reading and the second being a "fine" data reading.

As previously noted, the items of data to be recorded are provided one by one by the switches 26 and each item is amplified in the amplifier 27 and filtered and then passed to the analogue-to-digital converter 29 from which it issues as a series of pulses representing the bits of the data word. These pulses are recorded in the crash recorder 32 in serial form as they arrive and they are also stored in the serializer 30 so that whenever the serializer 30 contains the 11 bits making up a complete data word the whole data word is recorded on 11 parallel tracks on the tape in the tape recorder 33.

Figure 2:
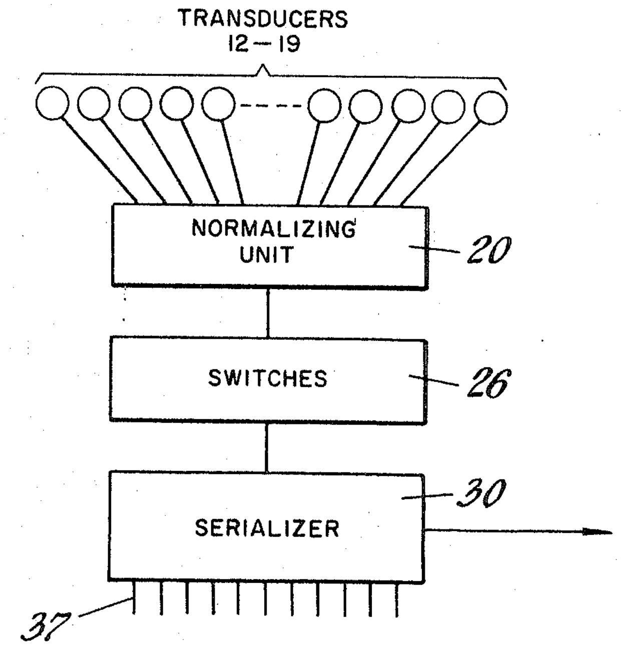
FIGURE 2 is a diagram to show how the serial and parallel data is derived.

FIGURE 2 shows diagrammatically how the data is handled. A group of transducers 12–19 is shown with leads therefrom passing to the normalizing unit 20 and thence through the switches 26 to the serializer 30, the amplifier, filter and analogue-to digital converted being omitted. In the serializer 30 the individual bits making up each item of data are stored so that pulses corresponding to these bits may issue over lines 37 when the serializer 30 is appropriately activated by the control 31.

Figure 3:
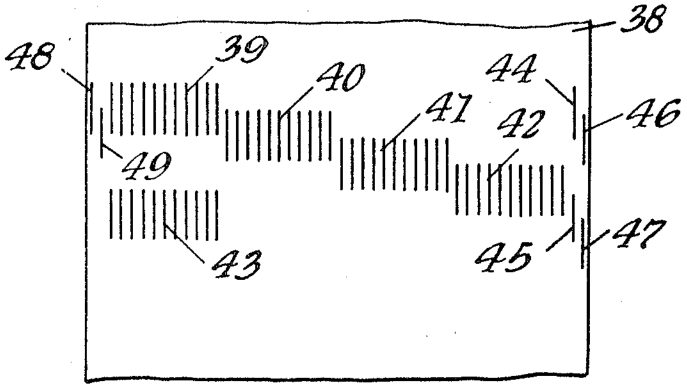
FIGURE 3 is a diagram to show how the bits representing data words are recorded on parallel tracks on the tape, together with identification pulses.

FIGURE 3 shows the arrangement of the magnetic tape 38, which has a total of 48 tracks. The tape has a width of two inches and therefore accommodates 24 tracks per inch of width. Two recording heads are used, each having a length equal to the full width of the tape and containing 24 equally spaced recording elements, the heads being arranged so that their tracks are interlaced. In this way one head records all the even-number tracks while the other records all the odd-number tracks.

Two tracks at each side of the tape are reserved for purposes which will be explained later and the remaining 44 tracks are used for recording four groups of 11 bits, each group being recorded simultaneously in parallel and each group being slightly spaced along the length of the tape with respect to the preceding group. As shown in FIGURE 3 the first group, indicated by reference 39, occupies the first 11 tracks. The pulses stored in the serializer 37 are "stretched," that is to say, the signals corresponding to the pulses are applied to the tape for a substantial length of time so that they occupy the length of the tape indicated in the group 39. The next group 40 of 11 pulses is applied to the second group of 11 tracks on the tape a little later than the first, and while the signals of the first group are still in being, so that the beginning of the second group of signals occurs half-way along the time period and length of the first group. The third group 41 of signals is applied at the instant when the first group ends, and while the second group is still in being, and the fourth group 42 of signals is applied at the instant when the second group 40 terminates, and the third group 41 is still in being. The fifth group 43 is applied at the instant when the third group 41 terminates and while the fourth group 42 is still in being, and this process goes on until the outputs of the 50 transducers have all been recorded.

In order to show the versatility of the system according to the invention a somewhat difficult situation has been assumed in which fifty separate items of data are to be recorded on a tape having 48 tracks, with 44 "usable" tracks, and with four groups of signals occupying the usable width of the tape. It will therefore be clear that the data word from the fifth transducer will be recorded in the second group of tracks and the data word from the first transducer on the next succeeding round of recording will occur in the third group of tracks on the tape. In playing back the recording for analysis and evaluation it is necessary to be able to recognize which track contains the item from the first transducer and the four unused tracks are employed for this purpose, the data being recorded in the 44 central tracks and the two tracks at each side of the tape being used for identification. A first bistable switch is actuated successively in one sense and the other sense at the beginning of each recording in an odd-number track and this causes a series of marks to be recorded each having a duration equal to the length of a recording and a space between marks of the same duration. Thus the mark 44 appears at the beginning of the recording of the signal group 39 and terminates at the beginning of the recording of the group 41, while the next mark 45 appears at the beginning of the recording of the group 43 and disappears at the beginning of the next recording (not shown) in the third track. A second bistable switch is actuated in the same way in relation to the even-number tracks. The mark 46 begins at the beginning of the recording of the group 40 of signals and ends when the recording of the group 42 begins, while the subsequent mark 47 begins at the beginning of the group following the group 40 which is to be recorded in the second set of tracks. In this way the two pulse series 44, 45 and 46, 47 make it possible to identify the odd and even-numbered tracks.

One of the tracks at the other side of the tape is used to record a series of marks 48 which also have a duration equal to the length of the recording of one group of signals but the marks 48 are only recorded with the signals from the first transducer. The remaining track is used to record a series of marks 49 which are only recorded with the signals from the second transducer.

I claim:

1. A magnetic recording system for aircraft comprising a first magnetic recorder having an endless metal recording element for recording data relating to the operation of the aircraft in flight which is usable for establishing conditions preceding a crash, a second magnetic recorder having a recording medium in the form of a conventional magnetic tape for recording the crash data with additional data representative of further information relating to the operation of the aircraft in flight, the recording medium of the second recorder being readily removable, a normalizing unit to receive the outputs in different forms from a plurality of transducers and to convert them to equivalent analogue voltages, switching means to select analogue voltages representing crash data and additional data, means to convert the selected analogue voltages to digital data words each made up of a plurality of bits, a serializer to store the bits representative of one data word, and control means to control the operation of the switching means and the serializer, the control means being effective to cause the switching means to select voltages representing crash information and additional information alternately in a predetermined order, the control means also being effective to cause the serializer to pass the bits representing crash information only directly to the first recorder for recording serially and to store the bits of all data words until each word is complete and to pass the bits forming the complete word to the second recorder for recording in parallel.

2. A system as claimed in claim 1 in which the tape is of sufficient width to accommodate the bits representing a plurality of words side by side, with additional identification tracks, each word being recorded slightly spaced along the length of the tape with respect to the preceding word, the words being recorded in progressive order across the width of the tape, additional signals identifying odd and even numbered words and the first and second words in the set of words constituting one series of recordings being recorded in the additional identification tracks.

3. A system as claimed in claim 1 or 2 comprising means to vary the alternating order once in each cycle of recordings so that two items of crash data are recorded consecutively followed by two spaces on the recording medium of the first recorder, whereby the necessity to record data identification signals on the recording element of the first recorder is avoided.

References Cited

UNITED STATES PATENTS

| | | | |
|---|---|---|---|
| 2,656,524 | 10/1953 | Gridley | 340—206 |
| 3,007,149 | 10/1961 | Brown | 340—347 |
| 3,061,192 | 10/1962 | Terzian | 235—157 |
| 3,196,401 | 7/1965 | Lamneck | 340—172.5 |
| 3,200,374 | 8/1965 | Ballard | 340—146.1 |
| 3,260,998 | 7/1966 | Fluegel | 340—172.5 |

JOHN P. VANDENBURG, Primary Examiner

U.S. Cl. X.R.

235—150